(12) United States Patent
Diard et al.

(10) Patent No.: US 7,525,549 B1
(45) Date of Patent: *Apr. 28, 2009

(54) DISPLAY BALANCE/METERING

(75) Inventors: Franck R. Diard, Mountain View, CA (US); Wayne Douglas Young, Milpitas, CA (US); Philip Browning Johnson, Campbell, CA (US)

(73) Assignee: Nvidia Corporation, Santa Clara, CA (US)

( * ) Notice: Subject to any disclaimer, the term of this patent is extended or adjusted under 35 U.S.C. 154(b) by 397 days.

This patent is subject to a terminal disclaimer.

(21) Appl. No.: 11/015,594

(22) Filed: Dec. 16, 2004

(51) Int. Cl.
*G06T 11/20* (2006.01)
*G06F 15/80* (2006.01)
*G09G 5/37* (2006.01)

(52) U.S. Cl. .................. 345/505; 345/440; 345/562

(58) Field of Classification Search ........ 345/501, 345/502, 503, 504, 505, 506, 153, 440, 537, 345/538, 539, 562; 395/164, 830
See application file for complete search history.

(56) References Cited

U.S. PATENT DOCUMENTS

| | | | |
|---|---|---|---|
| 5,333,263 A * | 7/1994 | Masaki et al. ............ | 345/506 |
| 5,657,478 A * | 8/1997 | Recker et al. ............ | 345/503 |
| 5,790,130 A | 8/1998 | Gannett | |
| 5,799,204 A * | 8/1998 | Pesto, Jr. .................. | 710/10 |
| 5,841,444 A | 11/1998 | Mun | |
| 6,023,281 A | 2/2000 | Grigor et al. | |
| 6,078,339 A | 6/2000 | Meinerth et al. | |
| 6,191,800 B1 | 2/2001 | Arenburg et al. | |
| 6,259,461 B1 | 7/2001 | Brown | |
| 6,266,072 B1 | 7/2001 | Koga et al. | |
| 6,317,133 B1 | 11/2001 | Root et al. | |
| 6,362,818 B1 | 3/2002 | Gardiner et al. | |
| 6,445,391 B1 | 9/2002 | Sowizral et al. | |
| 6,469,746 B1 | 10/2002 | Maida | |

(Continued)

FOREIGN PATENT DOCUMENTS

EP 0571969 5/2003

OTHER PUBLICATIONS

Molnar et al., "PixelFlow: HighSpeed Rendering Using Image Composition", SIGGRAPH 92, pp. 231-240.

(Continued)

*Primary Examiner*—Xiao M Wu
*Assistant Examiner*—Aaron M Guertin
(74) *Attorney, Agent, or Firm*—Townsend and Townsend and Crew LLP

(57) ABSTRACT

Method, apparatuses, and systems are presented for processing a sequence of images for display using a display device involving operating a plurality of graphics devices, including at least one first graphics device that processes certain ones of the sequence of images, including a first image, and at least one second graphics device that processes certain other ones of the sequence of images, including a second image, delaying processing of the second image by the at least one second graphics device, by a specified duration, relative to processing of the first image by the at least one first graphics device, to stagger pixel data output for the first image and pixel data output for the second image, and selectively providing output from the at least one first graphics device and the at least one second graphics device to the display device.

19 Claims, 7 Drawing Sheets

U.S. PATENT DOCUMENTS

| | | | |
|---|---|---|---|
| 6,473,086 B1 | 10/2002 | Morein et al. | |
| 6,570,571 B1 | 5/2003 | Morzumi | |
| 6,724,390 B1 | 4/2004 | Dragony et al. | |
| 6,747,654 B1 * | 6/2004 | Laksono et al. | 345/502 |
| 6,781,590 B2 | 8/2004 | Katsura et al. | |
| 6,791,551 B2 * | 9/2004 | Mukherjee et al. | 345/504 |
| 6,850,240 B1 * | 2/2005 | Jones, Jr. | 345/503 |
| 6,900,813 B1 * | 5/2005 | Stefanidis | 345/562 |
| 2002/0130870 A1 * | 9/2002 | Ebihara | 345/440 |
| 2003/0128216 A1 | 7/2003 | Walls et al. | |
| 2004/0075623 A1 | 4/2004 | Hartman | |
| 2005/0012749 A1 | 1/2005 | Gonzalez | |
| 2005/0088445 A1 | 4/2005 | Gonzalez | |

OTHER PUBLICATIONS

Whitman, "Dynamic Load Balancing For Parallel Polygon Rendering" IEEE Computer Graphics and Applications, IEEE Inc. New York, U.S. vol. 14, No. 4, pp. 41-48, Jul. 1, 1994.

* cited by examiner

DISPLAY BALANCE/METERING

CROSS-REFERENCES TO RELATED APPLICATIONS

The present application is being filed concurrently with the following related U.S. patent applications, which are assigned to NVIDIA Corporation, the assignee of the present invention, and the disclosures of which are hereby incorporated by reference for all purposes:

U.S. patent application Ser. No. 11/015,600, entitled "COHERENCE OF DISPLAYED IMAGES FOR SPLIT FRAME RENDERING IN A MULTI-PROCESSOR GRAPHICS SYSTEM".

U.S. patent application Ser. No. 11/015,593, entitled "SEQUENCING OF DISPLAYED IMAGES FOR SPLIT FRAME RENDERING IN A MULTI-PROCESSOR GRAPHICS SYSTEM".

The present application is related to the following U.S. patent applications, which are assigned to NVIDIA Corporation, the assignee of the present invention, and the disclosures of which are hereby incorporated by reference for all purposes:

U.S. patent application Ser. No. 10/990,712, filed Nov. 17, 2004, entitled "CONNECTING GRAPHICS ADAPTERS FOR SCALABLE PERFORMANCE".

U.S. patent application Ser. No. 11/012,394, filed Dec. 15, 2004, entitled "BROADCAST APERTURE REMAPPING FOR MULTIPLE GRAPHICS ADAPTERS".

U.S. patent application Ser. No. 10/642,905, filed Aug. 18, 2003, entitled "Adaptive Load Balancing In a Multi-Processor Graphics Processing System".

BACKGROUND OF THE INVENTION

The demand for ever higher performance in computer graphics has lead to the continued development of more and more powerful graphics processing subsystems and graphics processing units (GPUs). However, it may be desirable to achieve performance increases by modifying and/or otherwise utilizing existing graphics subsystems and GPUs. For example, it may be more cost effective to obtain performance increases by utilizing existing equipment, instead of developing new equipment. As another example, development time associated with obtaining performance increases by utilizing existing equipment may be significantly less, as compared to designing and building new equipment. Moreover, techniques for increasing performance utilizing existing equipment may be applied to newer, more powerful graphics equipment when it become available, to achieve further increases in performance.

On approach for obtaining performance gains by modifying or otherwise utilizing existing graphics equipment relates to the use of multiple GPUs to distribute the processing of images that would otherwise be processed using a single GPU. While the use of multiple GPUs to distribute processing load and thereby increase overall performance is a theoretically appealing approach, a wide variety of challenges must be overcome in order to effectively implement such a system. To better illustrate the context of the present invention, description of a typical computer system employing a graphics processing subsystem and a GPU is provided below.

FIG. 1 is a block diagram of a computer system 100 that includes a central processing unit (CPU) 102 and a system memory 104 communicating via a bus 106. User input is received from one or more user input devices 108 (e.g., keyboard, mouse) coupled to bus 106. Visual output is provided on a pixel based display device 110 (e.g., a conventional CRT or LCD based monitor) operating under control of a graphics processing subsystem 112 coupled to system bus 106. A system disk 107 and other components, such as one or more removable storage devices 109 (e.g., floppy disk drive, compact disk (CD) drive, and/or DVD drive), may also be coupled to system bus 106. System bus 106 may be implemented using one or more of various bus protocols including PCI (Peripheral Component Interconnect), AGP (Advanced Graphics Processing) and/or PCI-Express (PCI-E); appropriate "bridge" chips such as a north bridge and south bridge (not shown) may be provided to interconnect various components and/or buses.

Graphics processing subsystem 112 includes a graphics processing unit (GPU) 114 and a graphics memory 116, which may be implemented, e.g., using one or more integrated circuit devices such as programmable processors, application specific integrated circuits (ASICs), and memory devices. GPU 114 includes a rendering module 120, a memory interface module 122, and a scanout module 124. Rendering module 120 may be configured to perform various tasks related to generating pixel data from graphics data supplied via system bus 106 (e.g., implementing various 2-D and or 3-D rendering algorithms), interacting with graphics memory 116 to store and update pixel data, and the like. Rendering module 120 is advantageously configured to generate pixel data from 2-D or 3-D scene data provided by various programs executing on CPU 102. Operation of rendering module 120 is described further below.

Memory interface module 122, which communicates with rendering module 120 and scanout control logic 124, manages interactions with graphics memory 116. Memory interface module 122 may also include pathways for writing pixel data received from system bus 106 to graphics memory 116 without processing by rendering module 120. The particular configuration of memory interface module 122 may be varied as desired, and a detailed description is omitted as not being critical to understanding the present invention.

Graphics memory 116, which may be implemented using one or more integrated circuit memory devices of generally conventional design, may contain various physical or logical subdivisions, such as a pixel buffer 126 and a command buffer 128. Pixel buffer 126 stores pixel data for an image (or for a part of an image) that is read and processed by scanout module 124 and transmitted to display device 110 for display. This pixel data may be generated, e.g., from 2-D or 3-D scene data provided to rendering module 120 of GPU 114 via system bus 106 or generated by various processes executing on CPU 102 and provided to pixel buffer 126 via system bus 106. In some implementations, pixel buffer 126 can be double buffered so that while data for a first image is being read for display from a "front" buffer, data for a second image can be written to a "back" buffer without affecting the currently displayed image. Command buffer 128 is used to queue commands received via system bus 106 for execution by rendering module 120 and/or scanout module 124, as described below. Other portions of graphics memory 116 may be used to store data required by GPU 114 (such as texture data, color lookup tables, etc.), executable program code for GPU 114 and so on.

Scanout module 124, which may be integrated in a single chip with GPU 114 or implemented in a separate chip, reads pixel color data from pixel buffer 118 and transfers the data to display device 110 to be displayed. In one implementation, scanout module 124 operates isochronously, scanning out frames of pixel data at a prescribed refresh rate (e.g., 80 Hz) regardless of any other activity that may be occurring in GPU 114 or elsewhere in system 100. Thus, the same pixel data corresponding to a particular image may be repeatedly scanned out at the prescribed refresh rate. The refresh rate can be a user selectable parameter, and the scanout order may be varied as appropriate to the display format (e.g., interlaced or progressive scan). Scanout module 124 may also perform other operations, such as adjusting color values for particular display hardware and/or generating composite screen images by combining the pixel data from pixel buffer 126 with data for a video or cursor overlay image or the like, which may be obtained, e.g., from graphics memory 116, system memory 104, or another data source (not shown). Operation of scanout module 124 is described further below.

During operation of system 100, CPU 102 executes various programs that are (temporarily) resident in system memory 104. These programs may include one or more operating system (OS) programs 132, one or more application programs 134, and one or more driver programs 136 for graphics processing subsystem 112. It is to be understood that, although these programs are shown as residing in system memory 104, the invention is not limited to any particular mechanism for supplying program instructions for execution by CPU 102. For instance, at any given time some or all of the program instructions for any of these programs may be present within CPU 102 (e.g., in an on-chip instruction cache and/or various buffers and registers), in a page file or memory mapped file on system disk 128, and/or in other storage space.

Operating system programs 132 and/or application programs 134 may be of conventional design. An application program 134 may be, for instance, a video game program that generates graphics data and invokes appropriate rendering functions of GPU 114 (e.g., rendering module 120) to transform the graphics data to pixel data. Another application program 134 may generate pixel data and provide the pixel data to graphics processing subsystem 112 for display. It is to be understood that any number of application programs that generate pixel and/or graphics data may be executing concurrently on CPU 102. Operating system programs 132 (e.g., the Graphical Device Interface (GDI) component of the Microsoft Windows operating system) may also generate pixel and/or graphics data to be processed by graphics card 112.

Driver program 136 enables communication with graphics processing subsystem 112, including both rendering module 120 and scanout module 124. Driver program 136 advantageously implements one or more standard application program interfaces (APIs), such as OpenGL, Microsoft DirectX, or D3D for communication with graphics processing subsystem 112; any number or combination of APIs may be supported, and in some implementations, separate driver programs 136 are provided to implement different APIs. By invoking appropriate API function calls, operating system programs 132 and/or application programs 134 are able to instruct driver program 136 to transfer geometry data or pixel data to graphics card 112 via system bus 106, to control operations of rendering module 120, to modify state parameters for scanout module 124 and so on. The specific commands and/or data transmitted to graphics card 112 by driver program 136 in response to an API function call may vary depending on the implementation of GPU 114, and driver program 136 may also transmit commands and/or data implementing additional functionality (e.g., special visual effects) not controlled by operating system programs 132 or application programs 134.

In some implementations, command buffer 128 queues the commands received via system bus 106 for execution by GPU 114. More specifically, driver program 136 may write one or more command streams to command buffer 128. A command stream may include rendering commands, data, and/or state commands, directed to rendering module 120 and/or scanout module 124. In some implementations, command buffer 128 may include logically or physically separate sections for commands directed to rendering module 120 and commands directed to display pipeline 124; in other implementations, the commands may be intermixed in command buffer 128 and directed to the appropriate pipeline by suitable control circuitry within GPU 114.

Command buffer 128 (or each section thereof) is advantageously implemented as a first in, first out buffer (FIFO) that is written by CPU 102 and read by GPU 114. Reading and writing can occur asynchronously. In one implementation, CPU 102 periodically writes new commands and data to command buffer 128 at a location determined by a "put" pointer, which CPU 102 increments after each write. Asynchronously, GPU 114 may continuously read and process commands and data sets previously stored in command buffer 128. GPU 114 maintains a "get" pointer to identify the read location in command buffer 128, and the get pointer is incremented after each read. Provided that CPU 102 stays sufficiently far ahead of GPU 114, GPU 114 is able to render images without incurring idle time waiting for CPU 102. In some implementations, depending on the size of the command buffer and the complexity of a scene, CPU 102 may write commands and data sets for frames several frames ahead of a frame being rendered by GPU 114. Command buffer 128 may be of fixed size (e.g., 5 megabytes) and may be written and read in a wraparound fashion (e.g., after writing to the last location, CPU 102 may reset the "put" pointer to the first location).

In some implementations, execution of rendering commands by rendering module 120 and operation of scanout module 124 need not occur sequentially. For example, where pixel buffer 126 is double buffered as mentioned previously, rendering module 120 can freely overwrite the back buffer while scanout module 124 reads from the front buffer. Thus, rendering module 120 may read and process commands as they are received. Flipping of the back and front buffers can be synchronized with the end of a scanout frame as is known in the art. For example, when rendering module 120 has completed a new image in the back buffer, operation of rendering module 120 may be paused until the end of scanout for the current frame, at which point the buffers may be flipped. Various techniques for implementing such synchronization features are known in the art, and a detailed description is omitted as not being critical to understanding the present invention.

The system described above is illustrative, and variations and modifications are possible. A GPU may be implemented using any suitable technologies, e.g., as one or more integrated circuit devices. The GPU may be mounted on an expansion card, mounted directly on a system motherboard, or integrated into a system chipset component (e.g., into the north bridge chip of one commonly used PC system architecture). The graphics processing subsystem may include any amount of dedicated graphics memory (some implementations may have no dedicated graphics memory) and may use system memory and dedicated graphics memory in any combination. In particular, the pixel buffer may be implemented in dedicated graphics memory or system memory as desired. The scanout circuitry may be integrated with a GPU or provided on a separate chip and may be implemented, e.g., using one or more ASICs, programmable processor elements, other integrated circuit technologies, or any combination thereof. In addition, GPUs embodying the present invention may be incorporated into a variety of devices, including general purpose computer systems, video game consoles and other special purpose computer systems, DVD players, handheld devices such as mobile phones or personal digital assistants, and so on.

While a modem GPU such as the one described above may efficiently process images with remarkable speed, there continues to be a demand for ever higher graphics performance. By using multiple GPUs to distribute processing load, overall performance may be significantly improved. However, implementation of a system employing multiple GPUs relates to significant challenges. Of particular concern is the coordination of the operations performed by various GPUs. The present invention provides innovative techniques related to the timing of GPU operations relevant in a multiple GPU system.

BRIEF SUMMARY OF THE INVENTION

The present invention relates to methods, apparatuses, and systems for processing a sequence of images for display using a display device involving operating a plurality of graphics devices, each capable of processing images by performing rendering operations to generate pixel data, including at least one first graphics device and at least one second graphics device, using the plurality of graphics devices to process the sequence of images, wherein the at least one first graphics device processes certain ones of the sequence of images, including a first image, and the at least one second graphics device processes certain other ones of the sequence of images, including a second image, delaying processing of the second image by the at least one second graphics device, by a specified duration, relative to processing of the first image by the at least one first graphics device, to stagger pixel data output for the first image and pixel data output for the second image, and selectively providing output from the at least one first graphics device and the at least one second graphics device to the display device, to display pixel data for the sequence of images.

The specified duration may be determined by dividing an estimate of processing time for an image by a count of number of graphics devices used to process the sequence of images. The estimate of processing time may be based on at least one measured processing time corresponding to time elapsed while performing rendering operations for an image. The estimate of processing time may be based on at least one measured processing time corresponding to time elapsed between processing of a command for an image and processing of a similar command for a subsequent image. The at least one measured processing time may be generated from one of the plurality of graphics devices. Further, the estimate of processing time may be based on an averaged version of the at least one measured processing time taken over multiple images. Also, the estimate of processing time may be based on a filtered version of the at least one measured processing time taken over multiple images. The estimate of processing time may be periodically updated as the plurality of images are processed.

In one embodiment of the invention, the at least one first graphics device receives a first sequence of commands for processing images, the at least one second graphics device receives a second sequence of commands for processing images, and the at least one first graphics device delays the second graphics device's execution of the second sequence of commands relative to the at least one first graphics device's execution of the first sequence of commands. In another embodiment of the invention, the at least one first graphics device receives a first sequence of commands for processing images, the at least one second graphics device receives a second sequence of commands for processing images, and a software routine delays the at least one second graphics device's execution of the second sequence of commands with the at least one first graphics device's execution of the first sequence of commands.

According to one embodiment of the invention, the at least one first graphics device forms a first GPU group responsible for processing the first image, and the at least one second graphics device forms a second GPU group responsible for processing the second image. Processing of the second image by the second GPU group may be delayed, by the specified duration, relative to processing of the first image by the first GPU group. The specified duration may be determined by dividing the estimate of processing time by a count of number of GPU groups used to process the sequence of images.

DETAILED DESCRIPTION OF THE INVENTION

1. Multiple GPU Systems

Figure 1:
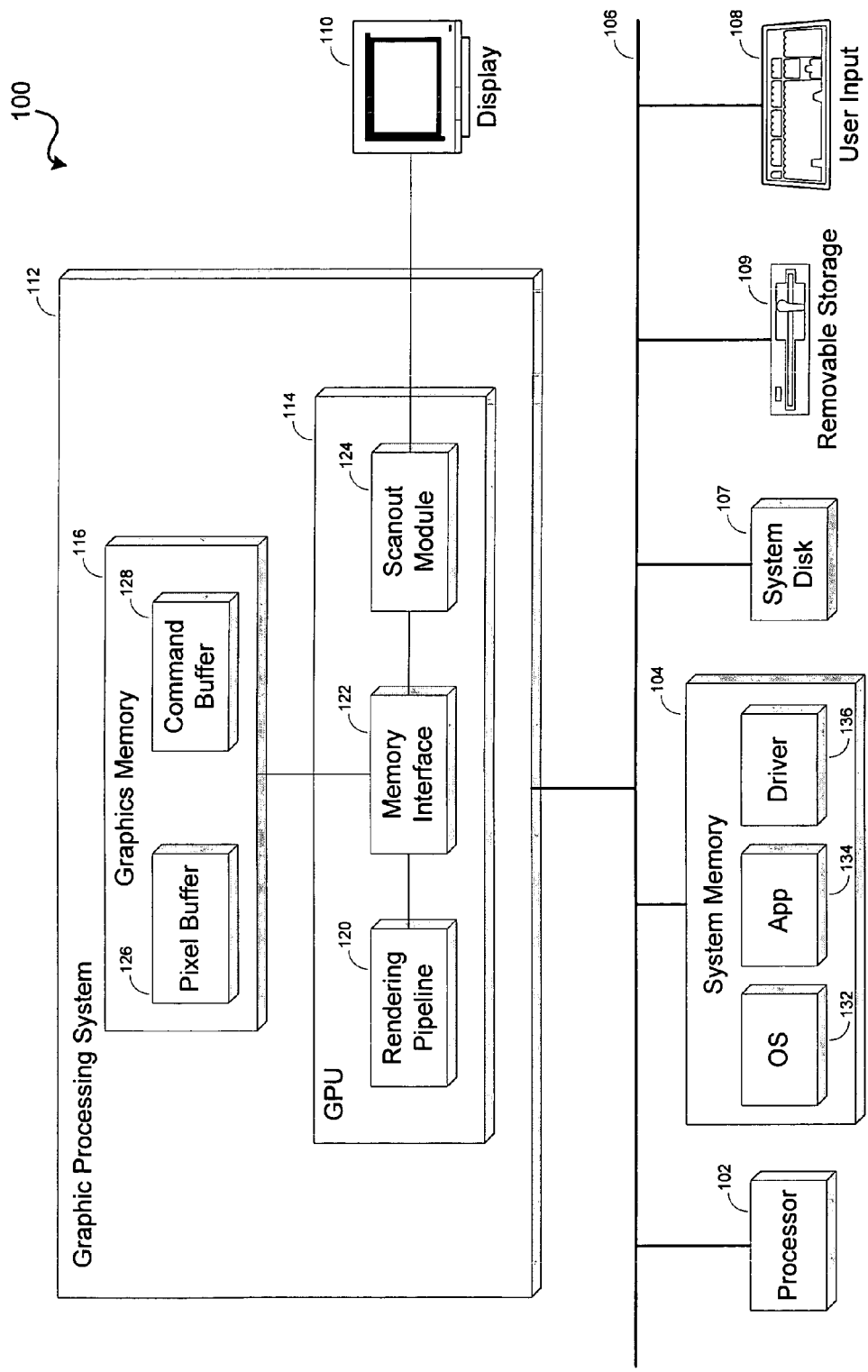
FIG. 1 is a block diagram of a computer system that includes a central processing unit (CPU) and a system memory communicating via a bus.
Figure 2:
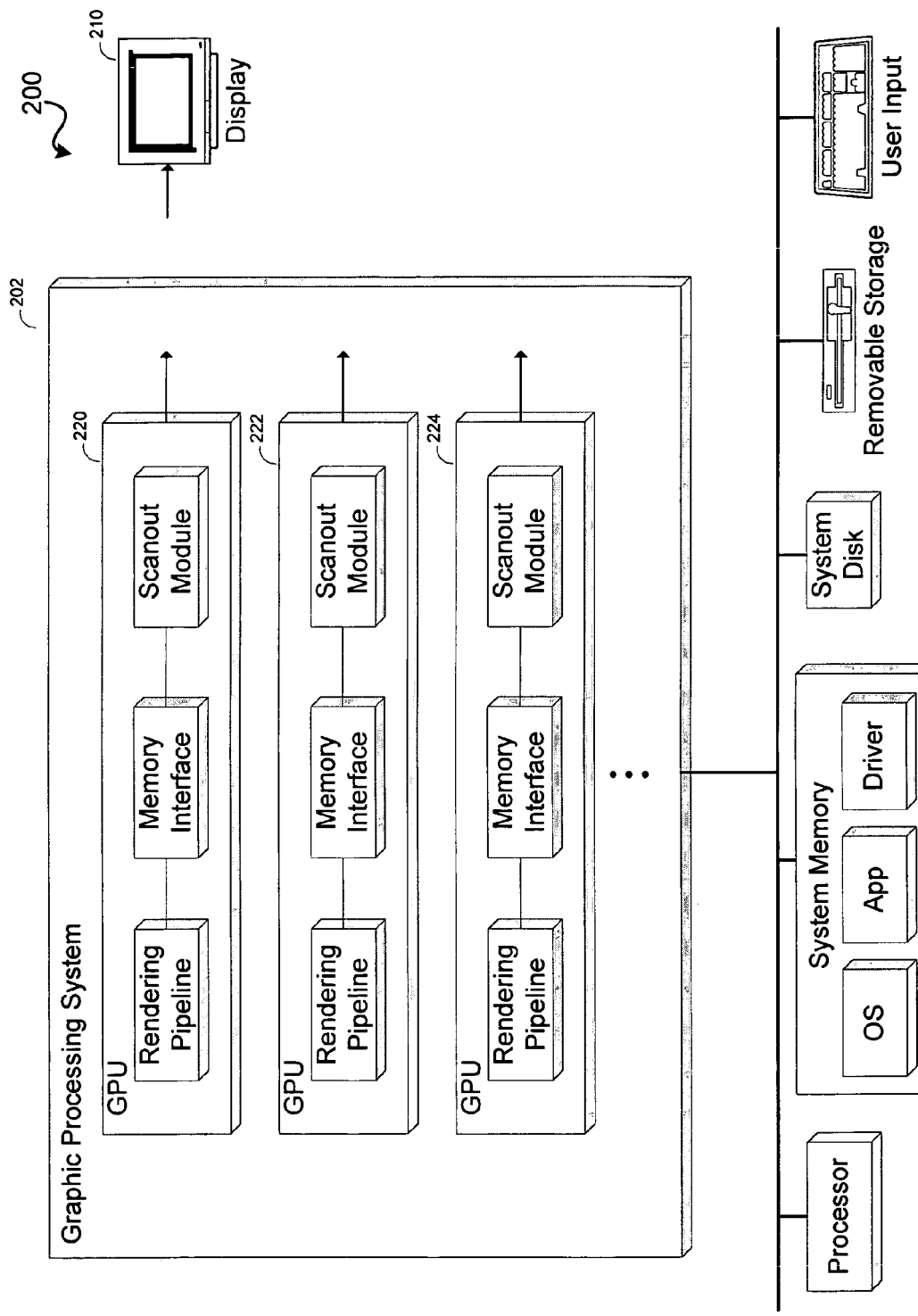
FIG. 2 is a block diagram of a computer system that employs multiple GPUs on a graphics processing subsystem according to one embodiment of the present invention.

FIG. 2 is a block diagram of a computer system 200 that employs multiple GPUs on a graphics processing subsystem according to one embodiment of the present invention. Like computer system 100 of FIG. 1, computer system 200 may include a CPU, system memory, system disk, removable storage, user input devices, and other components coupled to a system bus. Further, like computer system 100, computer system 200 utilizes a graphics processing subsystem 202 to produce pixel data representing visual output that is displayed using a display device 210. However, graphics processing subsystem 202 includes a plurality of GPUs, such as 220, 222, and 224. By utilizing more than one GPU, graphics processing subsystem 202 may effectively increase its graphics processing capabilities. In accordance with a technique that may be referred to as "alternate frame rendering" (AFR), for instance, graphics subsystem 202 may utilize the multiple GPUs to separately process images. For example, an ordered sequence of images comprising images 0, 1, 2, 3, 4, and 5 may be separately processed by GPUs 220, 222, and 224 as follows. GPU 220 processes image 0, then image 3. GPU 222 processes image 1, then image 4, and GPU 224 processes image 2, then 5. This particular manner of assigning images to GPUs is provided as a simple example. Other arrangement s are possible. Also, other ordered sequences of images may be of greater length.

FIG. 2 illustrates a simplified version of each of the GPUs 220, 222, and 224. Each of these GPUs may contain graphics memory (not shown) that includes a pixel buffer and a command buffer, as discussed previously with respect to GPU 114 shown in FIG. 1. As discussed, the pixel buffer may be doubled buffered by implementing a "front" buffer and a "back" buffer. To process an image, each GPU may utilizes a rendering module to perform rendering operations and write pixel data to the pixel buffer, as well as a scanout module to read and transfer pixel data from the pixel buffer to display device 210. Thus, GPU 220 may transfer out pixel data for image 0, followed by pixel data for image 3. GPU 222 may transfer out pixel data for image 1, followed by pixel data for image 4. GPU 224 may transfer out pixel data for image 2, followed by pixel data for image 5.

Appropriate circuitry may be implemented for selectively connecting the outputs of GPUs 220, 222, and 224 to display device 210, to facilitate the display of images 0 through 5. For example, an N-to-1 switch (not shown), e.g., N=3, may be built on graphics subsystem 202 to connect the outputs of GPU 220, 222, and 224 to display device 210. Alternatively, the GPUs may be arranged in a daisy-chain fashion, in which a first GPU is connected to display device 210, and the rest of the GPUs are connected in a chain that begins with the first GPU. In such an arrangement, each GPU may include an internal switching feature that can be controlled to switch between (1) outputting its own pixel data and (2) receiving and forwarding the pixel data of another GPU. By utilizing this internal switching feature, pixel data from any one of the GPUs may be directed through the chain of GPUs to display device 210. Details of such arrangements for systematically directing the outputs of multiple GPUs to a single display device are discussed in related U.S. application Ser. No. 10/990,712, titled "CONNECTING GRAPHICS ADAPTERS FOR SCALABLE PERFORMANCE" and U.S. patent application Ser. No. 11/012,394, titled "BROADCAST APERTURE REMAPPING FOR MULTIPLE GRAPHICS ADAPTERS".

Figure 3:
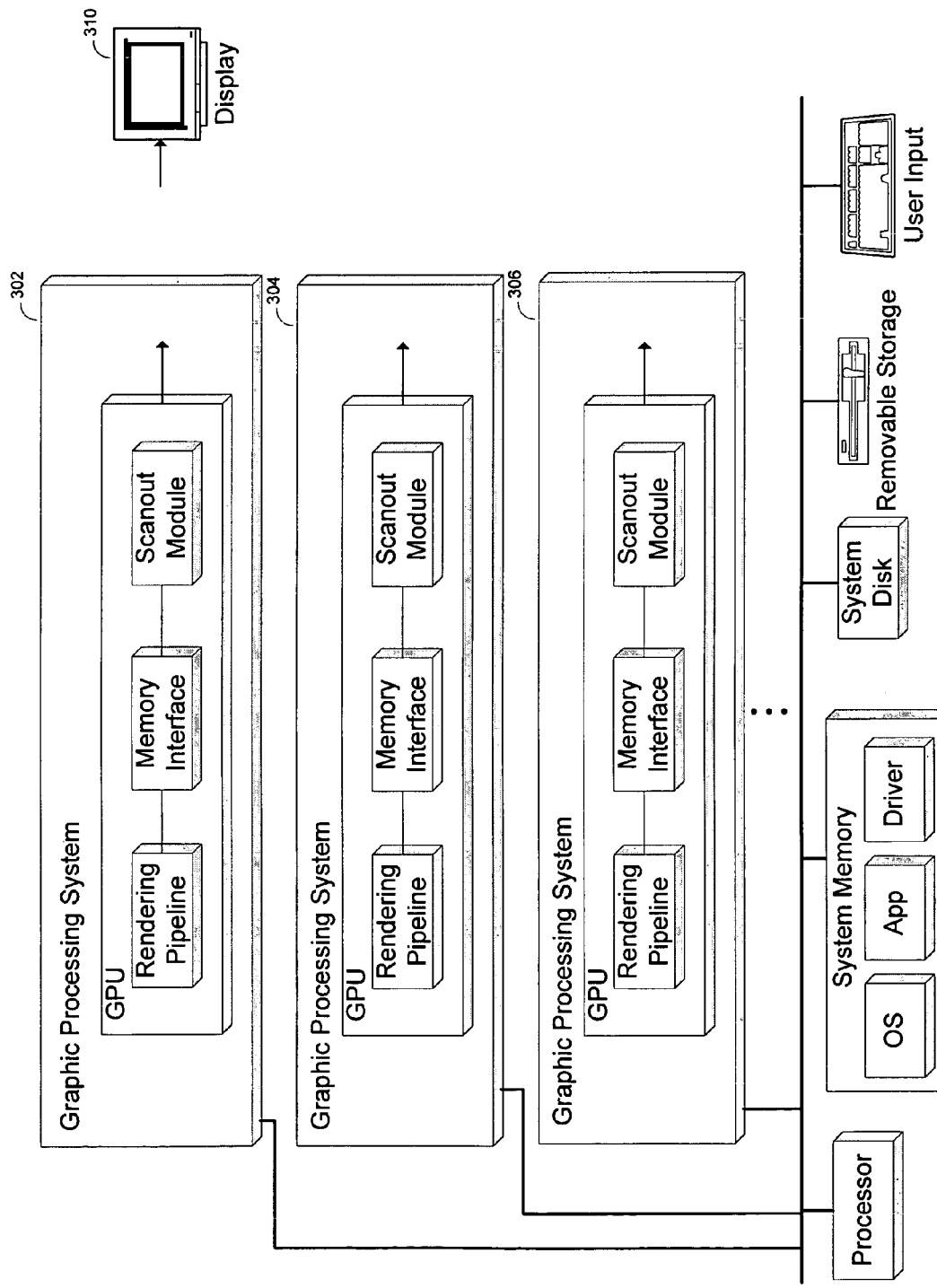
FIG. 3 is a block diagram of a computer system that employs multiple graphics processing subsystems each including at least one GPU according to an embodiment of the present invention.

FIG. 3 is a block diagram of a computer system 300 that employs multiple graphics processing subsystems each including at least one GPU according to an embodiment of the present invention. As shown in the figure, computer system 300 utilizes multiple graphics processing subsystems, such as 302, 304, and 306, to produce pixel data representing visual output that is displayed using a display device 310. Each of these graphics processing subsystems includes at least one GPU. Each GPU may operate in a manner similar to that described above. For example, each GPU may contain graphics memory (not shown) that includes a pixel buffer and a command buffer, and the pixel buffer may be doubled buffered by implementing a "front" buffer and a "back" buffer. Like computer system 200, computer system 300 utilizes multiple GPUs to effectively increase graphics processing power. However, in the case of computer system 300, the multiple GPUs may be implemented on separate graphics processing subsystems. Referring to the example of an ordered sequence of images comprising images 0, 1, 2, 3, 4, and 5, these images may be separately processed by GPUs on graphics processing subsystems 302, 304, and 306 as follows. A GPU on graphics subsystem 302 processes image 0 followed by image 3, a GPU on graphics subsystem 304 processes image 1 followed by image 4, and a GPU on graphics subsystem 306 processes image 2 followed by 5. Thus, graphics subsystems 302, 304, and 306 may separately transfer out pixel data for images 0 through 5, directed to display device 310. Appropriate circuitry may be implemented for selectively connecting outputs GPUs on graphics subsystem 302, 304, and 306 to display device 310. While FIG. 3 shows each of the multiple graphics processing subsystem as including only one GPU, it should be understood that each of the multiple graphics processing subsystem may include one or more GPUs according to various embodiments of the invention.

As shown in FIG. 2 and FIG. 3, multiple GPUs are utilized to separately process images to be presented on a display device. These GPUs may be implemented on a common graphics processing subsystem or distributed across different graphics processing subsystems. Though appropriate circuitry is implemented for selectively connecting outputs of the multiple GPUs to the display device, the timing of each GPU's output of pixel data for images, relatively to the timing of other GPUs' output of pixel data for other images, must still be controlled in some fashion. Techniques for controlling the timing of multiple GPUs used to process an ordered sequence of images such that images may be displayed in a sequentially correct manner are discussed in related U.S. patent application Ser. No. 11/015,593, titled "SEQUENCING OF DISPLAYED IMAGES FOR SPLIT FRAME RENDERING IN A MULTI-PROCESSOR GRAPHICS SYSTEM", which is mentioned previously. However, a related problem may persist associated with uneven durational output of images. A simple example is described below for purposes of illustration.

2. Relative Timing of Multiple GPUs

Figure 4A:
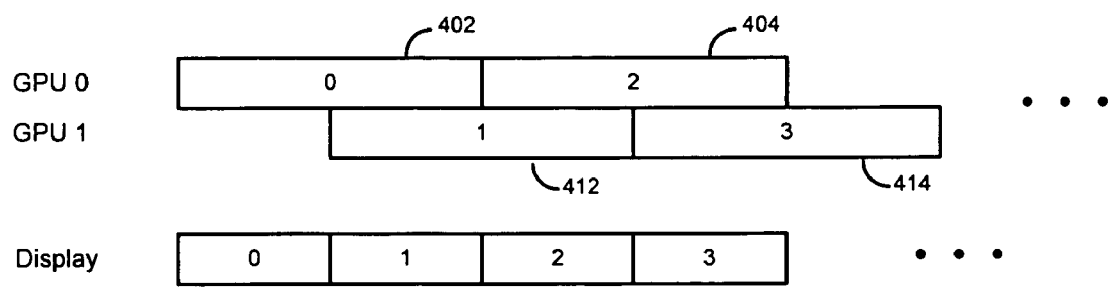
FIG. 4A depicts one scenario of the timing of two GPUs outputting pixel data corresponding to different images.

FIG. 4A depicts one scenario of the timing of two GPUs outputting pixel data corresponding to different images. An ordered sequence of images may include images 0, 1, 2, 3, 4, 5, .... Here, two GPUs, referred to as GPU 0 and GPU 1, are utilized to separately process the ordered sequence of images. GPU 0 processes images 0, 2, 4, 1 and GPU 1 processes images 1, 3, 5, ..., such that processing of the entire ordered sequence of images is distributed between the two GPUs. As described previously, a GPU may process a particular image by performing rendering operations to generate pixel data for the image and outputting the pixel data. When a GPU outputs pixel data corresponding to a particular image, a scanout module in the GPU may scan out frames of pixel data for the image at a prescribed refresh rate (e.g., 80 Hz). For example, in duration 402, GPU 0 may repeatedly output frames of pixel data corresponding to image 0 at the refresh rate. FIG. 4A shows durations 402 and 404, in which GPU 0 outputs pixel data for images 0 and 2, respectively. Also shown are durations 412 and 414, in which GPU 1 outputs pixel data for images 1 and 3, respectively. By alternately connecting to the outputs of GPU 0 and GPU 1, a display device may present pixel data for the ordered sequence of images—image 0, image 1, image 2, image 3, and so on, as shown in the figure.

Figure 4B:
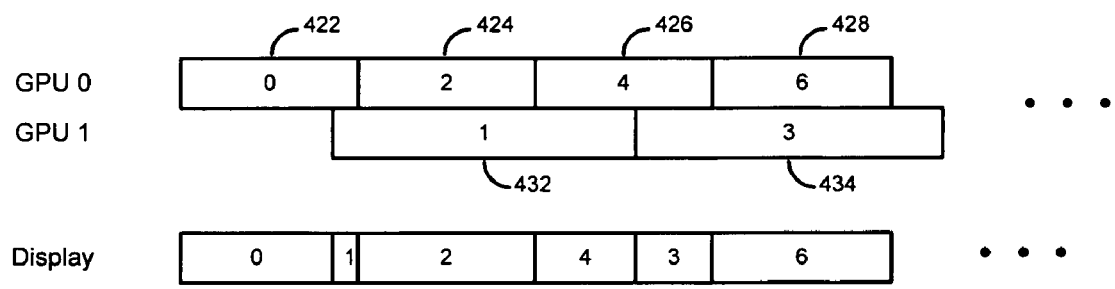
FIG. 4B depicts another scenario of the timing of two GPUs outputting pixel data corresponding to different images, resulting in sequentially incorrect output of an ordered sequence of images.

FIG. 4B depicts another scenario of the timing of two GPUs outputting pixel data corresponding to different images, resulting in sequentially incorrect output of an ordered sequence of images. FIG. 4B shows durations 422,

424, 426, and 428, in which GPU 0 outputs pixel data for images 0, 2, 4, and 6, respectively. Also shown are durations 432 and 434, in which GPU 1 outputs pixel data for images 1 and 3, respectively. Here, GPU 0 processes and outputs pixel data for images 0, 2, . . . at a pace that is faster than that of GPU 1 in processing and outputting pixel data for images 1, 3, . . . . The output of images 0, 2, . . . by GPU 0 thus become misaligned with the output of images 1, 3, . . . by GPU 1. As a result, by alternately connecting to the outputs of GPU 0 and GPU 1, a display device may present pixel data for the ordered sequence of images in a sequentially incorrect manner—image 0, image 1, image 4, image 3, image 6, and so on, as shown in the figure.

Figure 4C:
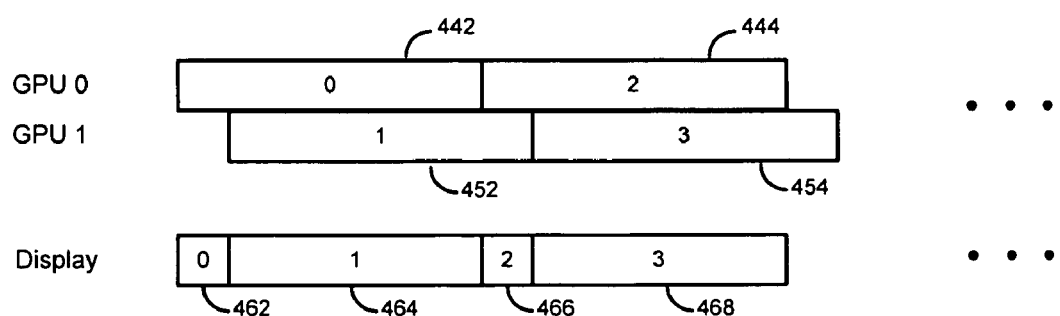
FIG. 4C depicts yet another scenario of the timing of two GPUs outputting pixel data corresponding to different images, resulting in uneven durational output of images.

FIG. 4C depicts yet another scenario of the timing of two GPUs outputting pixel data corresponding to different images, resulting in uneven durational output of images. FIG. 4C shows durations 442 and 444, in which GPU 0 outputs pixel data for images 0 and 2, respectively. Also shown are durations 452 and 454, in which GPU 1 outputs pixel data for images 1 and 3, respectively. Here, by controlling the timing of the GPUs such that GPU 0 does not outpace GPU 1, or vice versa, the sequence of the images is properly maintained. That is, by alternately connecting to the outputs of GPU 0 and GPU 1, a display device may present pixel data for the ordered sequence of images in a sequentially correct manner—image 0, image 1, image 2, image 3, and so on, as shown in the figure. However, even though these images are presented in a sequentially correct manner, the duration of images output by the display device is noticeably uneven. As shown, duration 462 for image 0 and duration 466 for image 2 are significantly shorter, when compared to duration 464 for image 1 and duration 468 for image 3. This may persist for subsequent images (not shown). From the perspective of a user, the effect of this unevenness may be quite dramatic. Because consecutive images often represent frames of a scene in motion, the uneven duration of these images can upset the user's perception of the intended motion in the scene. For example, the user may observe a "tearing" phenomenon as the images are rapidly displayed.

3. Timing Control By Master GPU

Figure 5:
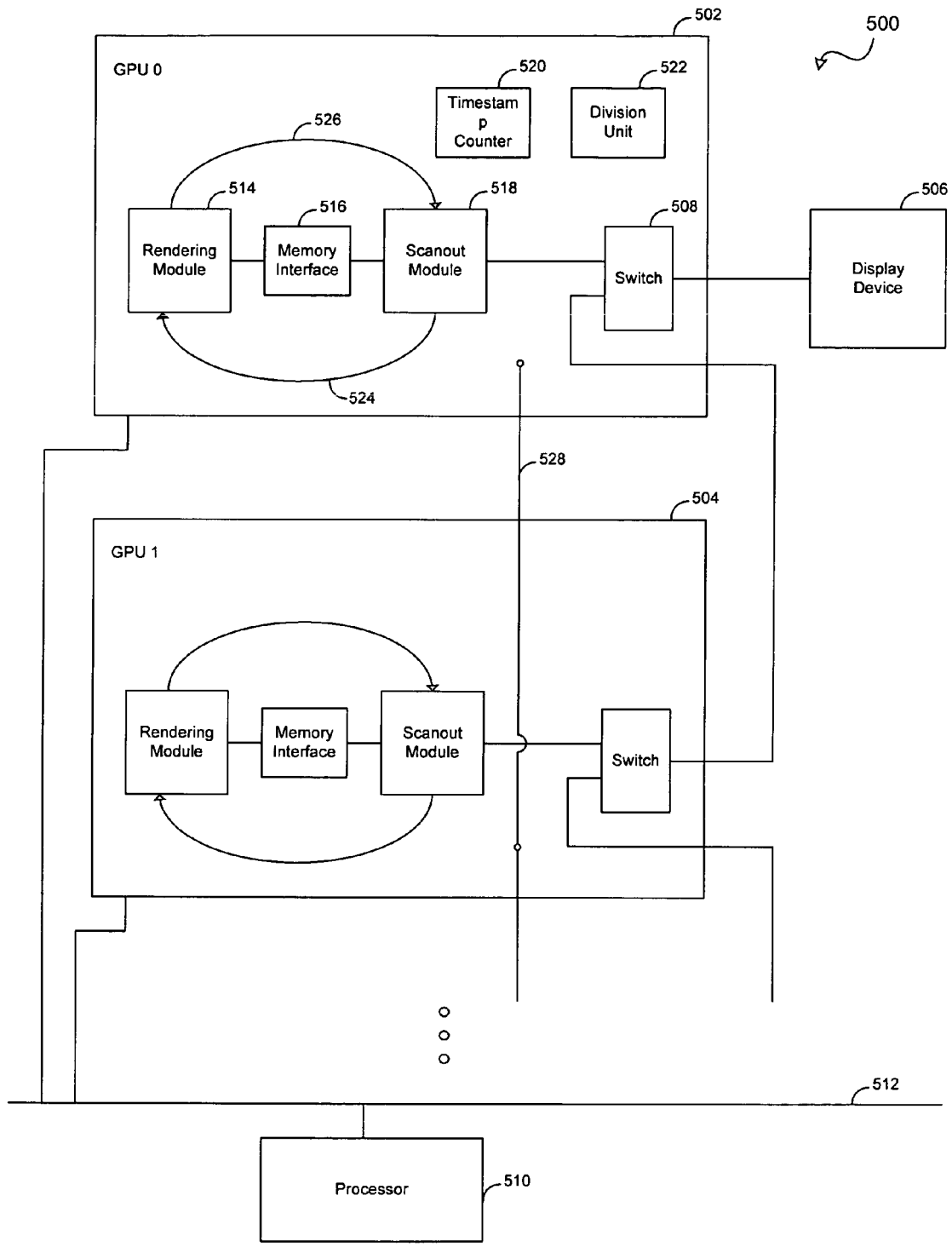
FIG. 5 is a block diagram of a system 500 in which relative timing of multiple GPUs may be controlled to effectuate even durational output of images, in accordance with various embodiments of the present invention.

FIG. 5 is a block diagram of a system 500 in which relative timing of multiple GPUs may be controlled to effectuate even durational output of images, in accordance with various embodiments of the present invention. As shown in the figure, multiple GPUs are connected in a daisy-chain configuration, as mentioned previously. The daisy-chain includes GPU 0 (502), followed by GPU 1 (504), and so on. GPU 0 is connected a display device 506. Each GPU may include an internal switch, such as switch 508, that can be controlled to switch between (1) outputting its own pixel data and (2) receiving and forwarding the pixel data of another GPU. By utilizing this internal switching feature, pixel data from any one of the GPUs may be directed through the chain of GPUs to display device 506. GPU 0, GPU 1, and so on, are coupled to a CPU 510 via a bus 512, as described previously.

GPU 0 includes rendering module 514, memory interface 516, and scanout module 518. Also, GPU 0 contains graphics memory (not shown) that includes a pixel buffer and a command buffer, and the pixel buffer may be doubled buffered by implementing a "front" buffer and a "back" buffer, as described previously. GPU 0 also includes a timestamp counter 520 and a division unit 522. Other GPUs in system 500, such as GPU 1, may include similar components as GPU 0.

According to one embodiment of the invention, GPU 0 serves as the "master" GPU amongst the GPUs in system 500 and influences the timing of the rest of the GPUs to achieve even durational output of images. Here, master GPU 0 obtains an estimate of the processing time of an image. Master GPU 0 may then delay the processing of one of the other GPUs by a fractional duration of the estimated processing time of an image. Master GPU 0 may also delay the processing of another one of other GPUs by a different fractional duration of the estimated processing time of an image. Master GPU 0 may operate in this manner to specify and apply a different delay to each of the non-master GPUs. This staggers the output of the GPUs to achieve even durational output of images by the GPUs. Such operations are described in more detail as follows.

For purposes of illustration, a simple example involving only two GPUs is presented—with GPU 0 serving as the master GPU, and GPU 1 serving as the only non-master GPU. In this example, GPU 0 and GPU 1 share the processing of an ordered sequence of images 0, 1, 2, 3, . . . , with GPU 0 processing images 0, 2, . . . , and GPU 1 processing images 1, 3, . . . . In the present embodiment of the invention, GPU 0 implements double buffering such that its rendering module can write to the back buffer while its scanout module can read from the front buffer, and a "flip" of the front and back buffers can begin the processing of a new image. Here, flipping of the back and front buffers is synchronized with the end of a scanout, as previously discussed. In GPU 0, for example, when rendering module 514 has completed writing of pixel data for a new image into the back buffer, operation of rendering module 514 may be paused until pixel data for the current image stored in the front buffer is completely scanned out at least once (thereafter, scanout module 514 may repeatedly scanout the current image at a prescribed refresh rate, such as 80 Hz). Similarly, GPU 1 also implements "double buffering" in the present embodiment of the invention.

Here, master GPU 0 obtains an estimate of the processing time of an image by observing its own processing of images. That is, GPU 0 measures the amount of time required for itself to process an image (such as image 0) and uses this as a general estimate of how long it currently takes another GPU in system 500 to process an image (such as image 1). This may be a reliable estimate because the amount of processing time spent by each GPU on consecutive images may be roughly the same. That is, from one image to the next, not very much graphical change may occur, and thus processing time per image may remain relatively stable.

In the present embodiment, master GPU 0 estimates the amount of time required for itself to process an image by measuring the elapsed time from (1) when scanout module 518 provides a signal 524 to indicate that it has completely scanned out the current image stored in the front buffer at least once—thus permitting rendering module 514 to begin performing rendering operations for yet another new image—to (2) when rendering module 514 provides a signal 526 to indicate that it has completed writing of pixel data for that new image into the back buffer. This elapsed time thus measures how long rendering module 518 took to perform rendering operations and generate pixel data for the new image. Because the processing time for an image may be mostly attributed to rendering operations, this elapsed time may provide an accurate estimate of the processing time of the image.

In one implementation, master GPU 0 utilizes timestamp counter 520 to obtain a first timestamp when scanout module 518 provides signal 524 and a second timestamp when rendering module 514 subsequently provides signal 526. The elapsed time is obtained by taking the difference between the first and the second timestamps. Each timestamp may be provided, for example, in units of pixel clocks. Each pixel clock may correspond to the amount of time devoted to a single pixel in scanning out pixels for entire frames at the prescribed refresh rate. In other embodiments, master GPU 502 may take the measurement described above over multiple images, and perform operations such as taking the average, median, etc., in order to obtain a better estimate of the processing time for an image.

Master GPU 0 calculates a fractional duration of the estimated processing time of an image. In this embodiment of the invention, the fractional duration is based on the number of GPUs used to share the processing of images in system 500 according to the following equation:

fractional duration=estimated processing time for an image/number of GPUs

For system 500, the number of GPUs used is two. Thus, the fractional duration is calculated as the estimated processing time for an image, divided by two. Master GPU 0 may utilize division unit 522 to perform the division operation.

Master GPU 0 delays processing of non-master GPU 1 by a duration that corresponds to the calculated fractional duration of the estimated processing time for an image. This creates staggering of the relative timing of master GPU O's processing of images 0, 2, . . . , and non-master GPU 1's processing of images 1, 3, . . . . This induced staggering of GPU 0 and GPU 1's relative timing creates even durational output of images 0, 1, 2, 3, . . . , as exhibited in a scenario such as that shown in FIG. 4A. Referring back to FIG. 5, in one implementation, master GPU 0 may delay processing of non-master GPU 1 by utilizing a synchronization signal 528 that is accessible by both GPU 0 and GPU 1. For ease of reference, this synchronization signal is referred to here as a "swap ready" signal.

Figure 6:
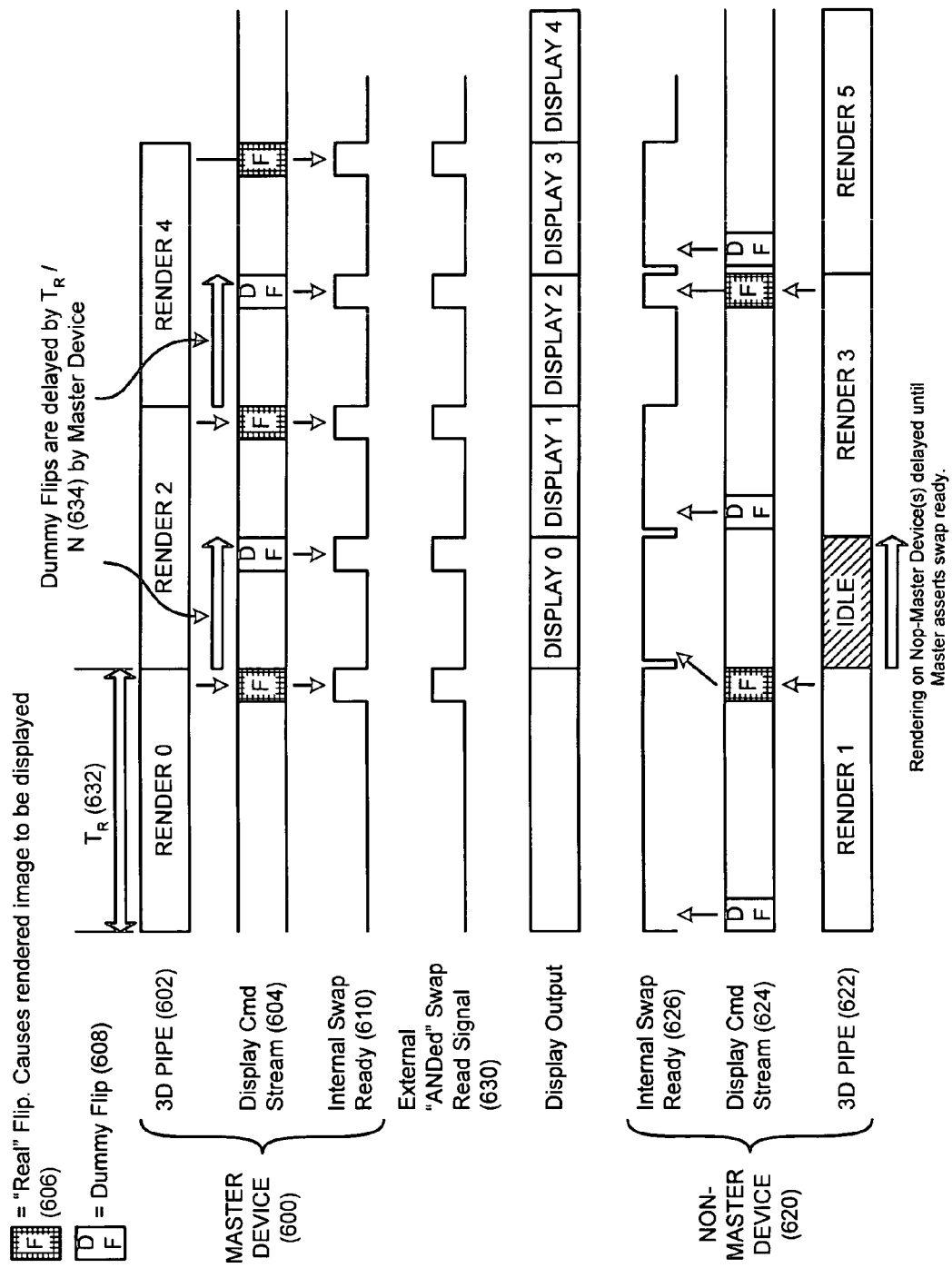
FIG. 6 is a timing diagram illustrating the delay of processing timing applied to a non-master device, relative to the processing timing of a master device.

FIG. 6 is a timing diagram illustrating the delay of processing timing applied to a non-master device, relative to the processing timing of a master device. Here, a master device (600) includes a rendering module. The timing 602 of the execution of rendering commands by master device 600's rendering module is labeled as "3D Pipe" to refer to the capability of this rendering module to execute three-dimensional rendering commands in a pipelined fashion. In various embodiments of the invention, such a rendering module may execute different types of commands. Master device 600 also includes a scanout module. The timing 604 of the execution of display commands by master device 600's scanout module is also shown. These display commands are shown to include "flip" commands 606 and "dummy flip" commands 608. Here, each "flip" commands instruct the scanout module to begin reading and scanning out pixel data for a particular image processed by the device. Each dummy flip command corresponds to the reading and scanning out of pixel data for a particular image processed by another device. Dummy flips inserted into the display command stream indicate the proper sequence of images and facilitate proper timing of image processing by different devices. Further, an internal "swap ready" signal 610 for master device 600 is also shown. Internal swap ready signal 610 is asserted when master device 600 is ready to allow a "flip" operation to take place for an image, including flips for images 0, 2, . . . processed by master device 600 and flips for images 1, 3, . . . processed by non-master device 620.

FIG. 6 also presents timing of a non-master device 620. Non-master device 620 includes a rendering module. The timing 622 of the execution of rendering commands by non-master device 620's rendering module is shown. Master device 600 also includes a scanout module. The timing 624 of the execution of display commands by master device 600's scanout module is also shown. These display commands also include flip commands and dummy flip commands, as described above. Further, an internal "swap ready" signal 626 for non-master device 600 is shown. Internal swap ready signal 626 is asserted when non-master device 620 is ready to allow a "flip" operation to take place for an image, including flips for images 1, 3, . . . processed by non-master device 620 and flips for images 0, 2, . . . processed by master device 600.

According to an embodiment of the present invention, an external "swap ready" signal 630 allows the master device to delay processing of the non-master device by a duration that corresponds to the calculated fractional duration of the estimated processing time for an image. External swap ready signal 630 may correspond to the synchronization signal 528 shown in FIG. 5. Here, external swap ready signal 630 corresponds to a logical "AND" of internal swap ready signal 610 and internal swap ready signal 626. Thus, external swap ready signal 630 represents an indication that both master device 600 and non-master device 620 are ready to allow a "flip" operation to take place for an image. Each device, including master device 600 and non-master device 620, observes external swap ready signal 630 and will only proceed with the execution of a flip command when external swap ready signal 630 is asserted for that flip command.

Master device 600 obtains an estimate processing time TR (632) of an image. Master device 600 delays the execution of dummy flips in display command stream 604 by a fractional duration 634 of the estimated processing time. Here, fractional duration 634 is calculated as TR divided by N, where N is the number of devices used process the sequence of images. In this case, N is equal to two. Correspondingly, assertions of the internal swap ready signal 610 in master device 600 associated with these dummy flips are also delayed by fractional duration 634. Finally, these delays are reflected in the external swap ready signal 630. In this manner, master device 600 delays assertions of external swap ready signal 630 for images 1, 3, . . . , such that non-master device 620's execution of flip commands for these images are delayed by the fractional duration 634 of the estimated processing time of an image. This control of the relative timing between master device 600 and non-master device creates even durational output 632 of images 0, 1, 2, 3, . . . .

While a simple example of two devices is explicitly provided above, similar operations for more than two devices is well within the scope of the present invention. For example, there may be three devices—a master device, a first non-master device, and a second non-master device. In such a case, in accordance with the present embodiment of the invention, the fractional duration may be calculated as the estimated processing time for an image, divided by three. Further, the master device may delay processing of the first non-master GPU by a duration that corresponds to 1× the calculated fractional duration. The master device may then delay processing of the second non-master device by a duration that corresponds to 2× the calculated fractional duration. Thus, staggering of the processing of the three device can also be achieved. These operations can be extended to yet a greater number of devices.

According to another embodiment of the invention, relative timing of the processing of images by different GPU groups may also be controlled to achieve even durational output of images. Here, each GPU group refers to a collection of one or more GPUs. GPUs from a GPU group may jointly process a single image. For example, in a mode that may be referred to as "split frame rendering," two or more GPUs may jointly process a single image by dividing the image into multiple portions. A first GPU may be responsible for processing one portion of the image (e.g., performing rendering operations and scanning out pixel data for that portion of the image), a second GPU may be responsible for processing another portion of the image, and so on. Thus, each "device" in FIG. 6 may correspond to a GPU or a GPU group. Details of techniques related to "split frame rendering" are discussed in related U.S. patent application Ser. No. 11/015,600, titled "COHERENCE OF DISPLAYED IMAGES FOR SPLIT FRAME RENDERING IN A MULTI-PROCESSOR GRAPHICS SYSTEM" and U.S. patent application Ser. No. 10/642,905, entitled "Adaptive Load Balancing In a Multi-Processor Graphics Processing System", which are mentioned previously.

In a similar manner as discussed previously, a fractional duration of the estimated processing time of an image by a GPU group may be calculated. In one embodiment of the invention, the fractional duration is based on the number of GPU groups used to share the processing images according to the following equation:

fractional duration=estimated processing time for an image/number of *GPU* groups For example, if there are two GPU groups, the fractional duration is calculated as the estimated processing time for an image, divided by two.

4. Timing Control By Software

According to the one embodiment of the invention, software such as driver software executed on a CPU controls the timing of the operations of multiple GPUs or GPU groups, to achieve even durational output of images. For example, referring to FIG. 5, driver software executed on CPU 510 may control the timing of the GPU 0 and GPU 1. Here, GPU 0 and GPU 1 each contains a rendering module that receives commands from a rendering command stream and a scanout module that operates in conjunction with the rendering command. The scanout module does not receive a separate a display command stream. Instead, the scanout module automatically reads and outputs pixel data for each image generated by the rendering module. However, in other embodiments, the scanout module may receive a separate display command stream. Further, GPU 0 and GPU 1 each implements double buffering such that its rendering module can write to the back buffer while its scanout module can read from the front buffer, and a "flip" of the front and back buffers can begin the processing of a new image. In the present embodiment of the invention, each time a rendering module of a GPU encounters a flip command, the GPU generates an interrupt. The interrupt is serviced by an interrupt service routine provided by the software. The interrupt service routine keeps track of the progression of each GPU in its processing of images and may selectively delay a GPU when necessary to achieve more even durational output of images.

The driver software may obtain an estimate of the processing time of an image by measuring the elapsed time between flip commands encountered by a GPU. For example, each time the interrupt service routine is called to service an interrupt associated with a flip command encountered by a particular GPU, the interrupt service routine may obtain a time stamp value from that GPU. This time stamp value may be generated by timestamp counter 520 for GPU 0, for instance, in FIG. 5. By recording the elapsed time from one flip command to the next flip command encountered by the GPU, the software can estimate the processing time of an image. This measurement may be taken over multiple images, and various operations may be performed to obtain a better estimate of the processing time for an image. For example, the measurements may be used to calculate an average, a median, and/or other figure. Also, the measurements may be filtered to remove some highest measurements or lowest measurements. A combination of the above may also utilized, such as filtering out highest M measurements and lowest M measurements, then averaging the remaining measurements. Other operations may also be utilized for obtaining a more useful measurement as is known in the art.

Using the estimate of processing time for an image, the driver software may specify a fractional duration of the estimated processing time of an image. The fractional duration may be based on the number of GPUs, or number of GPU groups, used to distribute the processing images in the system. For example, the fractional duration may calculated as the estimated processing time for an image divided by the number of GPUs (or GPU groups), such as previously discussed.

The driver software may also measure the time offset between a flip command encountered by one GPU and a flip command encountered by another GPU. For example, when GPU 0 encounters a flip command and generates an interrupt, the interrupt service routine may record a first CPU timestamp value. When GPU 1 encounters a flip command and generates an interrupt, the interrupt service routine may record a second CPU timestamp value. The difference between the first and the second CPU timestamp values may be used as a measure of the time offset of the flip commands in GPU 0 and GPU 1. Each CPU timestamp value may be a regularly incremented value that is not specific to any GPU, and may be obtained, for instance, from CPU 510 in FIG. 5.

According to the present embodiment of the invention, if the time offset is less than the fractional duration of processing time calculated, the driver software may delay processing by a GPU or GPU group until the fractional duration of processing time is reached. For example, for a system utilizing two GPUs to process images, the fractional duration is half of the processing time of an image. If the measured time offset between flip commands encountered by GPU 0 and GPU 1 is less than half the processing time for an image, the interrupt service routine may delay the processing of GPU 1 to cause a time offset of half the processing time for an image between GPU 0 and GPU 1. There may be a number of ways to implement such a delay. One implementation allows the interrupt service routine associated with a flip command encountered by a GPU to simply hang until half of the processing time for an image (the fractional duration) has elapsed. In such a case, the interrupt service routine may request that the operating system for CPU 510 place a thread associated with execution of the driver software in a sleep mode for a certain amount of time, after which the driver software wakes and continues processing. This amount of time may be expressed in terms of numbers of CPU cycles. In this manner, the appropriate delay may be achieved.

In another implementation, the driver software utilizes a semaphore to delay the appropriate GPU. To delay a GPU, a command may be issued for the GPU to acquire a semaphore and hold off processing until it has acquired the semaphore. Availability of the semaphore may be represented as the presence of a predetermined value at a certain memory location. For example, the GPU may halt processing of an image until it finds the predetermined value at the memory location. When it finds the predetermined value at the memory location, the GPU acquires the semaphore and continues processing of the image. For much of the time, a GPU may not need to be delayed. If that is the case, the interrupt service routine associated with a flip command may simply set the memory location to the predetermined value. A GPU executing the flip command would then immediately proceed with further processing of images. When a GPU needs to be delayed, the interrupt service routine associated with a flip command may set the memory location to a value other than the predetermined value. In addition, the interrupt service routine may request that the operating system wait for a certain amount of time and then launch a small piece of code (such as a short thread) that will set the memory location to the predetermined value. The amount of time may be expressed in terms of numbers of CPU cycles. In this manner, the semaphore can be made available after an appropriate amount of delay, without halting any processing of the driver software. Accordingly, these and other implementations may be utilized by the driver software to continually monitor the time offset between GPU 0 and GPU 1, and effectively add to that offset when necessary to maintain the proper relative timing of the two GPUs.

According to another embodiment of the invention, the driver software may periodically monitor and control the timing offset between GPU 0 and GPU 1. For instance, the "flipping" of front and back buffers in a GPU may be accomplished in such an embodiment without requiring every "flip" to be accompanied by an interrupt that is generated by the GPU and serviced by software executing in the CPU. However, for every N images processed, the GPU may generate an interrupt associated with a flip command, so that the interrupt may be serviced by an interrupt service routine. The interrupt service routine may then operate as indicated above to obtain an estimate of processing time for an image, calculate a fractional duration of the estimated processing time, and delay processing of one GPU relative to the other GPU, according to the fractional duration, in a similar manner as already described. Therefore, such an embodiment would allow the driver software to control the timing of the operations of multiple GPUs or GPU groups, at a frequency controlled by the parameter N, to achieve even durational output of images.

Figure 7:
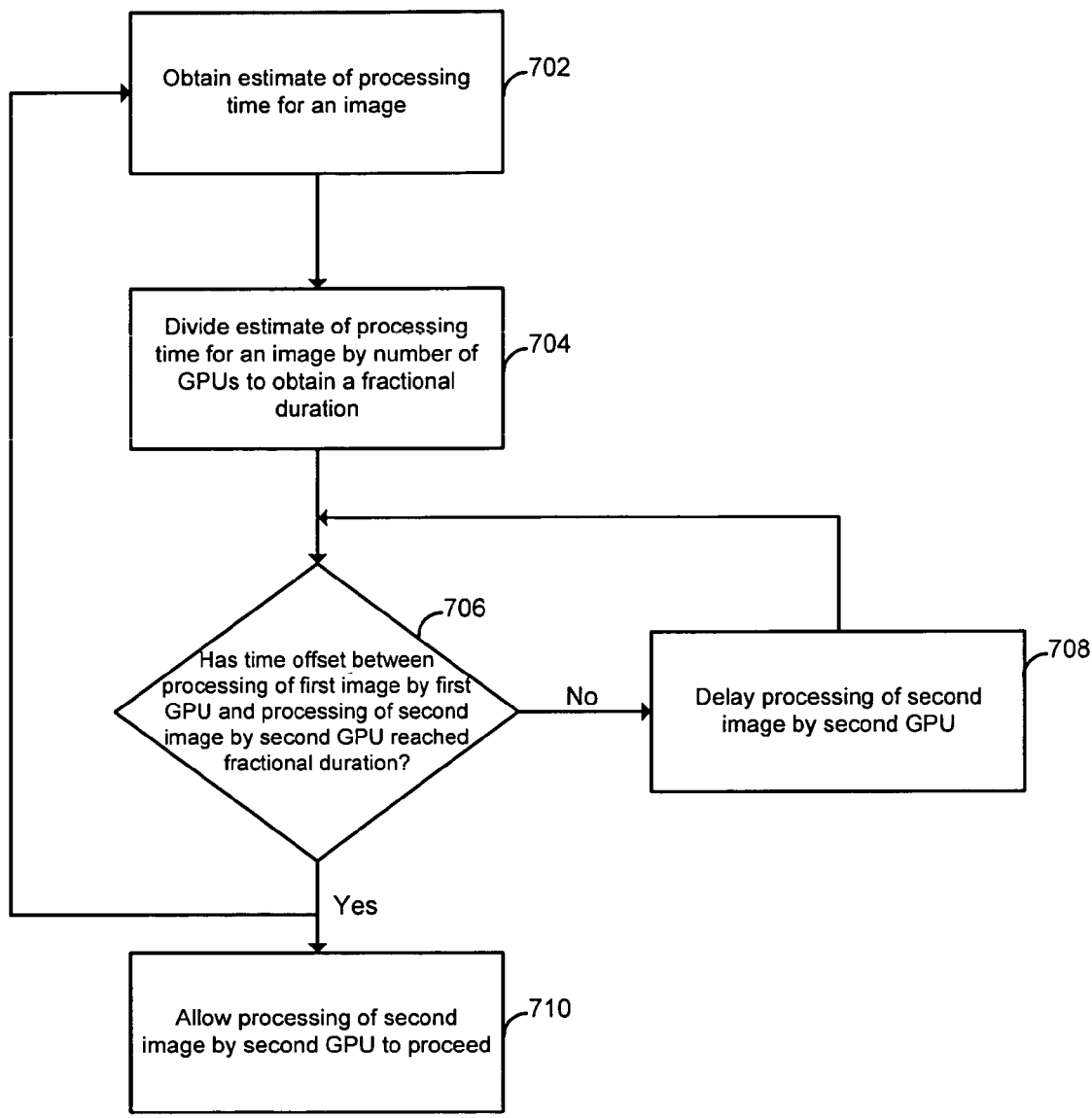
FIG. 7 is a flow chart outlining representative steps performed for controlling the timing of operations of two GPUs to achieve even durational output of images, according to an embodiment of the invention.

FIG. 7 is a flow chart outlining representative steps performed for controlling the timing of operations of two GPUs to achieve even durational output of images, according to an embodiment of the invention. As mentioned previously, such steps may be extended to two or more GPUs operating to process a sequence of images. Further, such steps may be extended to two or more GPU groups operating to process a sequence of images. In a step 702, an estimate is obtained of the processing time required for an image. For example, this may be an average processing time for an image, obtained over multiple images. The processing time may be estimated by observing the rendering processing of one or more images by a particular GPU, as described previously. In a step 704, a fractional duration is obtained by dividing the estimated processing time for an image by the number of GPUs, or number of GPU groups, used to process the sequence of images.

In a step 706, it is determined whether the time offset between the processing of a first image by a first GPU and the processing of a second image by a second GPU the GPU has reached the fractional duration. If so, processing of the second image by the second GPU is delayed in a step 708, and the process returns to step 706. Otherwise, in a step 710, processing of the second image by the second GPU is allowed to proceed. These steps may involve an explicit determination by software such as driver software to determine whether the time offset has been reached. In other embodiments, this step may be implemented with timing signals that carry out the necessary logic to allow the second GPU to proceed with processing of the second image, after processing of the first image by the first GPU has occurred for a sufficient time offset.

Finally, the entire process may be repeated by returning to step 702. The process may be repeated at a specified frequency, as mentioned previously.

While the present invention has been described in terms of specific embodiments, it should be apparent to those skilled in the art that the scope of the present invention is not limited to the described specific embodiments. The specification and drawings are, accordingly, to be regarded in an illustrative rather than a restrictive sense. It will, however, be evident that additions, subtractions, substitutions, and other modifications may be made without departing from the broader spirit and scope of the invention as set forth in the claims.

What is claimed is:

1. A method for processing a sequence of images for display using a display device comprising:

operating a plurality of graphics devices, each capable of processing images by performing rendering operations to generate pixel data, including at least one first graphics device and at least one second graphics device, each graphics device of the plurality of graphics devices including an internal switching feature configurable to select between outputting pixel data generated by the graphics device and receiving and forwarding pixel data of another graphics device, wherein the at least one first graphics device is configured to assert a synchronization signal and the at least one second graphics device is configured to monitor the synchronization signal, and wherein the at least one first graphics device controls, at least in part, the operation of the at least one second graphics device by asserting or deasserting the synchronization signal;

using the plurality of graphics devices to process the sequence of images, wherein the at least one first graphics device processes certain ones of the sequence of images, including a first image, and the at least one second graphics device processes certain other ones of the sequence of images, including a second image;

delaying processing of the second image by the at least one second graphics device, by a specified duration, relative to processing of the first image by the at least one first graphics device, to stagger pixel data output for the first image and pixel data output for the second image, wherein the specified duration is based on an estimate of processing time for an image, wherein the estimate of processing time is based on at least one measured processing time for an image, wherein the at least one measured processing time corresponds to time elapsed between processing of a command for an image and processing of a similar command for a subsequent image, and wherein the graphics devices are configured to execute a plurality of different commands, wherein delaying processing of the second image by the at least one graphics device further comprises:

deasserting the synchronization signal for the specified duration to delay processing of the second image by the at least one second graphics device; and after deasserting the synchronization signal for specified duration, asserting the synchronization signal to signal the at least one second graphics device to resume processing of the second image by the at least one second graphics device; and selectively providing output from the at least one first graphics device and the at least one second graphics device to the display device, to display pixel data for the sequence of images, wherein the plurality of graphics devices are arranged in a daisy chain configuration wherein pixel data from each of plurality of pixel devices is directed to the display device along the daisy chain configuration via the internal switching feature included in the plurality of graphics devices.

2. The method of claim 1 wherein the specified duration is determined by dividing the estimate of processing time by a count of number of graphics devices used to process the sequence of images.

3. The method of claim 1 wherein the at least one measured processing time corresponds to time elapsed while performing rendering operations for an image.

4. The method of claim 1 wherein the command and the similar command each relates to a flip operation to alternate buffers for writing pixel data and reading pixel data.

5. The method of claim 1 wherein the at least one measured processing time is generated from one of the plurality of graphics devices.

6. The method of claim 1 wherein the estimate of processing time is based on an averaged version of the at least one measured processing time taken over multiple images.

7. The method of claim 1 wherein the estimate of processing time is based on a filtered version of the at least one measured processing time taken over multiple images.

8. The method of claim 1 wherein the estimate of processing time is periodically updated as the plurality of images are processed.

9. The method of claim 1,
wherein the at least one first graphics device receives a first sequence of commands for processing images, and the at least one second graphics device receives a second sequence of commands for processing images; and
wherein the at least one first graphics device delays the second graphics device's execution of the second sequence of commands relative to the at least one first graphics device's execution of the first sequence of commands.

10. The method of claim 9 wherein the at least one first graphics device utilizes a synchronization signal to delay processing of the second image by the second graphics device.

11. The method of claim 1 wherein the at least one first graphics device receives a first sequence of commands for processing images, and the at least one second graphics device receives a second sequence of commands for processing images; and
wherein a software routine delays the at least one second graphics device's execution of the second sequence of commands with the at least one first graphics device's execution of the first sequence of commands.

12. The method of claim 1 wherein each of the graphics devices is a graphics processing unit (GPU).

13. The method of claim 1 wherein the at least one first graphics device forms a first graphics device group responsible for processing the first image, and the at least one second graphics device forms a second graphics device group responsible for processing the second image.

14. The method of claim 13 wherein processing of the second image by the second graphics device group is delayed, by the specified duration, relative to processing of the first image by the first graphics device group.

15. The method of claim 14 wherein the specified duration is determined by dividing the estimate of processing time by a count of number of graphics device groups used to process the sequence of images.

16. The method of claim 13 wherein each of the first and second graphics device groups is a GPU group.

17. The method of claim 1 wherein delay is applied when time offset between processing of the first image by the first graphics device and processing of the second image by the second graphics device is measured to be less than the specified duration.

18. An apparatus for processing a sequence of images for display using a display device comprising:
a plurality of graphics devices each capable of processing images by performing rendering operations to generate pixel data, including at least one first graphics device and at least one second graphics device, each graphics device of the plurality of graphics devices including an internal switching feature configurable to select between outputting pixel data generated by the graphics device and receiving and forwarding pixel data of another graphics device;
wherein the at least one first graphics device is capable of processing certain ones of the ordered sequence of images, including a first image, and the at least one second graphics device is capable of processing certain other ones of the ordered sequence of images, including a second image, the first image preceding the second image in the ordered sequence of images;
wherein the at least one first graphics device is configured to assert a synchronization signal and the at least one second graphics device is configured to monitor the synchronization signal, and wherein the at least one first graphics device controls, at least in part, the operation of the at least one second graphics device by asserting or deasserting the synchronization signal;
wherein an operation of the at least one second graphics device is capable of being delayed, by a specified duration, relative to processing of the first image by the at least one first graphics device to stagger pixel data output for the first image and pixel data output for the second image, wherein the specified duration is based on an estimate of processing time for an image, wherein the estimate of processing time is based on at least one measured processing time for an image, wherein the at least one measured processing time corresponds to time elapsed between processing of a command for an image and processing of a similar command for a subsequent image, and wherein the graphics devices are configured to execute a plurality of different commands, wherein delaying processing of the second image by the at least one graphics device further comprises:
deasserting the synchronization signal for the specified duration to delay processing of the second image by the at least one second graphics device; and
after deasserting the synchronization signal for specified duration, asserting the synchronization signal to signal the at least one second graphics device to resume processing of the second image by the at least one second graphics device; and
wherein one of the plurality of graphics devices is configured selectively provide output from the at least one first graphics device and the at least one second graphics device to the display device, to display pixel data for the sequence of images, wherein the plurality of graphics devices are arranged in a daisy chain configuration, and wherein pixel data from each of plurality of pixel devices is directed to the display device along the daisy chain configuration via the internal switching feature included in the plurality of graphics devices.

19. A system for processing a sequence of images for display using a display device comprising:

means for operating a plurality of graphics devices, each capable of processing images by performing rendering operations to generate pixel data, including at least one first graphics device and at least one second graphics device, each graphics device of the plurality of graphics devices including an internal switching feature configurable to select between outputting pixel data generated by the graphics device and receiving and forwarding pixel data of another graphics device, wherein the at least one first graphics device is configured to assert a synchronization signal and the at least one second graphics device is configured to monitor the synchronization signal, and wherein the at least one first graphics device controls, at least in part, the operation of the at least one second graphics device by asserting or deasserting the synchronization signal;

means for using the plurality of graphics devices to process the sequence of images, wherein the at least one first graphics device processes certain ones of the sequence of images, including a first image, and the at least one second graphics device processes certain other ones of the sequence of images, including a second image;

means for delaying processing of the second image by the at least one second graphics device, by a specified duration, relative to processing of the first image by the at least one first graphics device, to stagger pixel data output for the first image and pixel data output for the second image, wherein the specified duration is based on an estimate of processing time for an image, wherein the estimate of processing time is based on at least one measured processing time for an image, wherein the at least one measured processing time corresponds to time elapsed between processing of a command for an image and processing of a similar command for a subsequent image, and wherein the graphics devices are configured to execute a plurality of different command wherein delaying processing of the second image by the at least one graphics device further comprises:

deasserting the synchronization signal for the specified duration to delay processing of the second image by the at least one second graphics device; and after deasserting the synchronization signal for specified duration, asserting the synchronization signal to signal the at least one second graphics device to resume processing of the second image by the at least one second graphics device; and means for selectively providing output from the at least one first graphics device and the at least one second graphics device to the display device, to display pixel data for the sequence of images, wherein the plurality of graphics devices are arranged in a daisy chain configuration, and wherein pixel data from each of plurality of pixel devices is directed to the display device along the daisy chain configuration via the internal switching feature included in the plurality of graphics devices.

* * * * *